(12) United States Patent
Peterson et al.

(10) Patent No.: US 10,292,026 B1
(45) Date of Patent: *May 14, 2019

(54) SYSTEM AND METHOD FOR PERSISTING MOBILE AGENTS WITHIN A MOBILE REGION OF INTEREST

(71) Applicant: OPEN INVENTION NETWORK LLC, Durham, NC (US)

(72) Inventors: Robert W. Peterson, Plano, TX (US); Mark Gerard, McKinney, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/265,919

(22) Filed: Sep. 15, 2016

Related U.S. Application Data

(63) Continuation of application No. 14/444,074, filed on Jul. 28, 2014, now Pat. No. 9,451,382, which is a continuation of application No. 13/078,941, filed on Apr. 2, 2011, now Pat. No. 8,793,357.

(51) Int. Cl.
| | |
|---|---|
| *H04W 4/50* | (2018.01) |
| *H04L 29/08* | (2006.01) |
| *H04W 4/021* | (2018.01) |
| *H04W 76/14* | (2018.01) |
| *H04W 84/18* | (2009.01) |

(52) U.S. Cl.
CPC ............... *H04W 4/50* (2018.02); *H04L 67/10* (2013.01); *H04W 4/021* (2013.01); *H04W 76/14* (2018.02); *H04W 84/18* (2013.01)

(58) Field of Classification Search
CPC ........ H04W 4/001; H04W 4/021; H04L 67/10
See application file for complete search history.

(56) References Cited

U.S. PATENT DOCUMENTS

| | | | |
|---|---|---|---|
| 2002/0038372 A1* | 3/2002 | Idehara | ................... H04L 67/04 709/227 |
| 2004/0088348 A1* | 5/2004 | Yeager | ................... H04L 67/104 709/202 |

* cited by examiner

*Primary Examiner* — Ranodhi Serrao

(57) ABSTRACT

Mobile agents can be deployed to mobile devices within specific regions of interest to achieve specific goals in respect of events occurring in the region of interest. In order to ensure that the agent can persist within the region of interest until the agent goals are achieved, the agent is configured to locate other devices within the region of interest and to propagate itself, by moving or copying itself, to those other devices. The region of interest may be a mobile and/or dynamic region of interest defined by, for example, a proximity to one or more mobile wireless access points or by an overlapping peer-to-peer communication range of a plurality of mobile devices that are configured to support the agent.

20 Claims, 10 Drawing Sheets

SYSTEM AND METHOD FOR PERSISTING MOBILE AGENTS WITHIN A MOBILE REGION OF INTEREST

CROSS-REFERENCE TO RELATED APPLICATIONS

This application claims priority of and is a continuation of U.S. Ser. No. 14/444,074, entitled SYSTEM AND METHOD FOR PERSISTING MOBILE AGENTS WITHIN A MOBILE REGION OF INTEREST, filed on Jul. 28, 2014, issued as U.S. Pat. No. 9,451,382 on Sep. 20, 2016, which is a continuation of U.S. Ser. No. 13/078,941, entitled SYSTEM AND METHOD FOR PERSISTING MOBILE AGENTS WITHIN A MOBILE REGION OF INTEREST, filed on Apr. 2, 2011, issued as U.S. Pat. No. 8,793,357 on Jul. 29, 2014, incorporated herein by reference in their entirety.

FIELD OF THE INVENTION

This disclosure relates to the deployment and execution of agents to mobile devices.

BACKGROUND OF THE INVENTION

In mobile communications, mobile devices may be configured to receive and support mobile agents for performing various tasks. However, the value of a ubiquitous network of mobile sensory input has yet to be leveraged in the marketplace. Today, there is an increase in low cost, low power micro-electronics, sensors and wireless technologies. For example, the user of a location-aware mobile device may encounter or identify a real-world event. The user can choose to download and execute an intelligent agent-based software application to the mobile device to achieve a specific goal with or for the user.

The user will need to eventually leave the event or have some other need that requires termination of the Agent on the device. This could happen before the Agent goal is completed. In prior art applications, this will typically mean that the agent software is not able to continue to achieve its goal.

What is required is an improved system and method that enables mobile agents to persist in a mobile region of interest.

SUMMARY OF THE INVENTION

Mobile agents can be deployed to mobile devices within specific regions of interest to achieve specific goals in respect of events occurring in the region of interest. In order to ensure that the agent can persist within the region of interest until the agent goals are achieved, the agent is configured to locate other devices within the region of interest and to propagate itself, by moving or copying itself, to those other devices. The region of interest may be a mobile and/or dynamic region of interest defined by, for example, a proximity to one or more mobile wireless access points or by an overlapping peer-to-peer communication range of a plurality of mobile devices that are configured to support the agent. Other embodiments for defining the mobile region of interest are also possible.

In one aspect of the disclosure, there is provided a method for deploying an agent to a mobile population of devices. The method comprises deploying an agent to a first mobile device and executing the agent on the first mobile device. A mobile region of interest may be defined from the first mobile device. The agent may be replicated on at least one second mobile device within the mobile region of interest and executed on the at least one second mobile device.

In one aspect of the disclosure, there is provided a mobile device executing an agent application on at least one processor of the mobile device. The agent application may be configured to engage in peer-to-peer communication with a second mobile device. If the agent is able to determine that a second mobile device is within a mobile region of interest then the agent may replicate to the second device.

In one aspect of the disclosure, there is provided a computer-readable medium comprising computer-executable instructions for execution by at least one processor of a first mobile device. Execution of the instructions executes an agent application in which a mobile region of interest incorporating a communication range of the first mobile device is defined. The mobile device engages in peer-to-peer communication with a second mobile device which prompts the agent application to replicate to the second mobile device. The agent application expands the definition of the mobile region of interest to incorporate the second mobile device.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
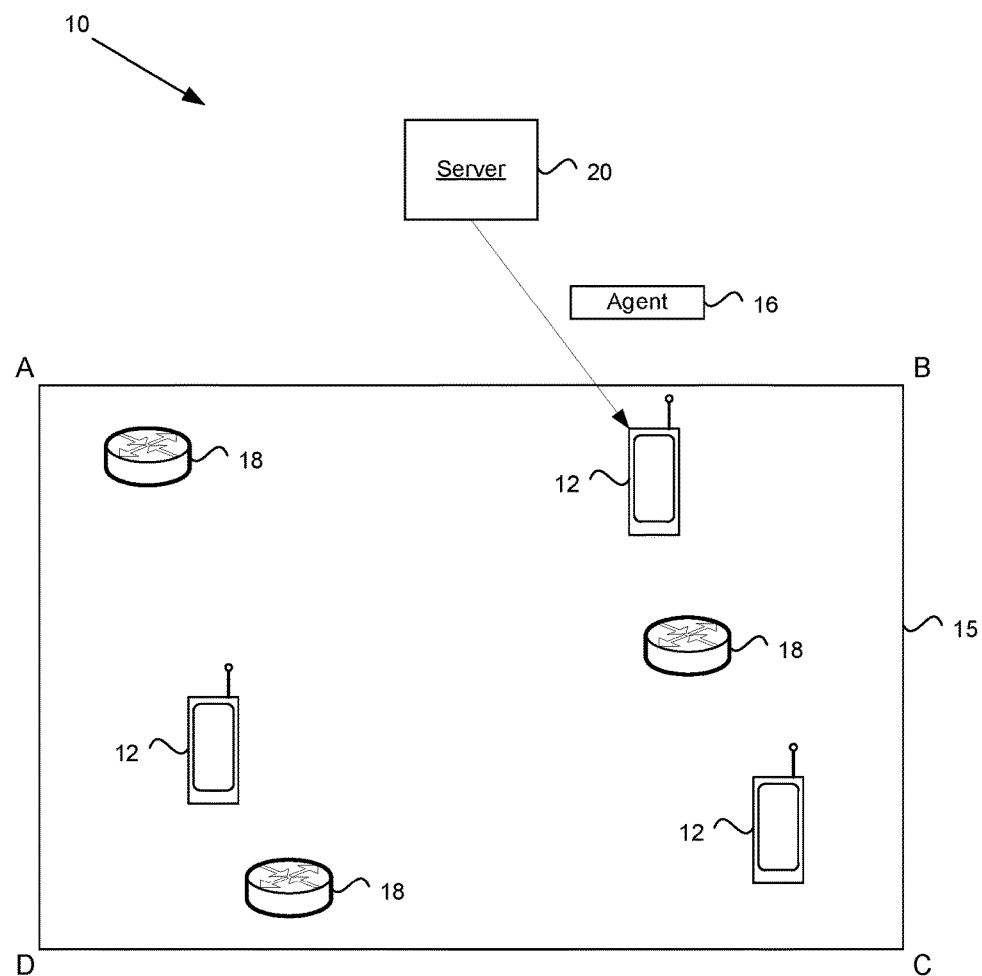
FIG. 1 illustrates a network serving a region of interest.

In FIG. 1, there is shown a network 10 that includes a server 20 and any number of mobile devices 12. The mobile devices may communicate with the server 20 through any suitable communications protocol. The network 10 supports peer-to-peer communication but otherwise, the state or type of the network is not relevant to the essence of the disclosure. The mobile devices 12 may communicate with the server 20 and with each other through one or more base stations 18. Typically, the devices 12 may be of many types including cellular phones, personal digital assistants (PDA), netbooks, laptops, and the like.

The mobile devices 12 are generally configured to support dynamic, executable content through the network and may receive content from the server 20. In particular, the server 20 may deploy an agent application 16 to a mobile device 12, for example in response to a request from the device 12. As described above, agents 16 may be made applicable to particular events within a region of interest. In addition, the region of interest may be mobile. The server 20 is thus able to define a boundary of the region of interest in order to characterize where the event is taking place. In one embodiment, the region of interest may be defined by a series of latitude/longitude points or some similar array of coordinates. Alternatively, a region of interest may be defined as being within communication range of a particular base station 18 or set of base stations.

In the present embodiments, the agent 16 may require its host device to be location aware. Awareness of location may be determined by an in-built system, such as a GPS or similar, which is able to provide the device with its present location to a required degree of accuracy. Alternatively or in addition, a device may be location aware by receiving information from the server or via communications with the base stations 18.

A user at a mobile device 12 is able to download an agent 16 from the server 20 and to execute the agent 16 on the device 12 in order to achieve a particular goal. The goal may be in respect of a particular event occurring within a region of interest 15 covered by the network 10. Examples of applications and goals of the agent are provided in more detail below.

As described above, there can be contention when the user needs to leave the ROI or have some other need that requires termination of the agent on the device before the goals of the agent have been achieved. In order to strike a balance between the user's needs and the agent's needs on the device, the agent software should be deployed so that it is able to persist its presence within the ROI to service others who enter the ROI.

Figure 2:
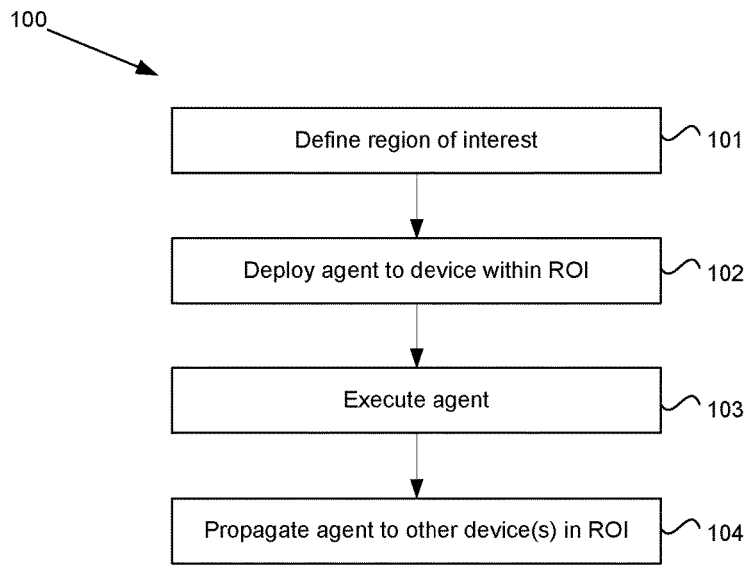
FIG. 2 illustrates a process for deploying a mobile agent into the region of interest.

A method for deployment of the agent into the ROI is illustrated in the flowchart 100 of FIG. 2. At step 101, an ROI is defined for a particular agent application 16. The agent application 16 is then deployed to at least one mobile device 12 (step 102), for example in response to a request from the mobile device 12. The agent then executes (step 103) and as part of the execution of the agent, the agent may propagate itself to one or more other agents within the ROI (step 104), thereby ensuring that the agent can persist until the agent functions are completed.

Initially, the mobile device need not be in the ROI when it receives the agent but when the device 12 moves into the ROI the agent will detect that the device is within the event boundaries and begin execution. Similarly, when the device 12 leaves the event boundary defined by the ROI, the agent may terminate or place itself into a stand-by mode.

Agent propagation may occur by moving or copying the Agent between participating devices within the ROI. In either scenario, the Agent's motivation is to remain actively executing within the ROI. This serves to flood the ROI with Agents that act independently from each other and function toward the same goal.

Figure 4:
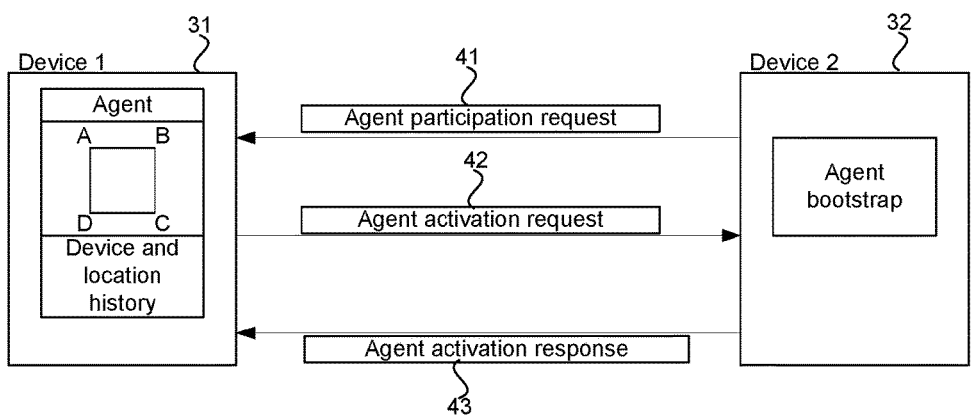
FIG. 4 illustrates a message flow when a device copies an agent to a second device.
Figure 3:
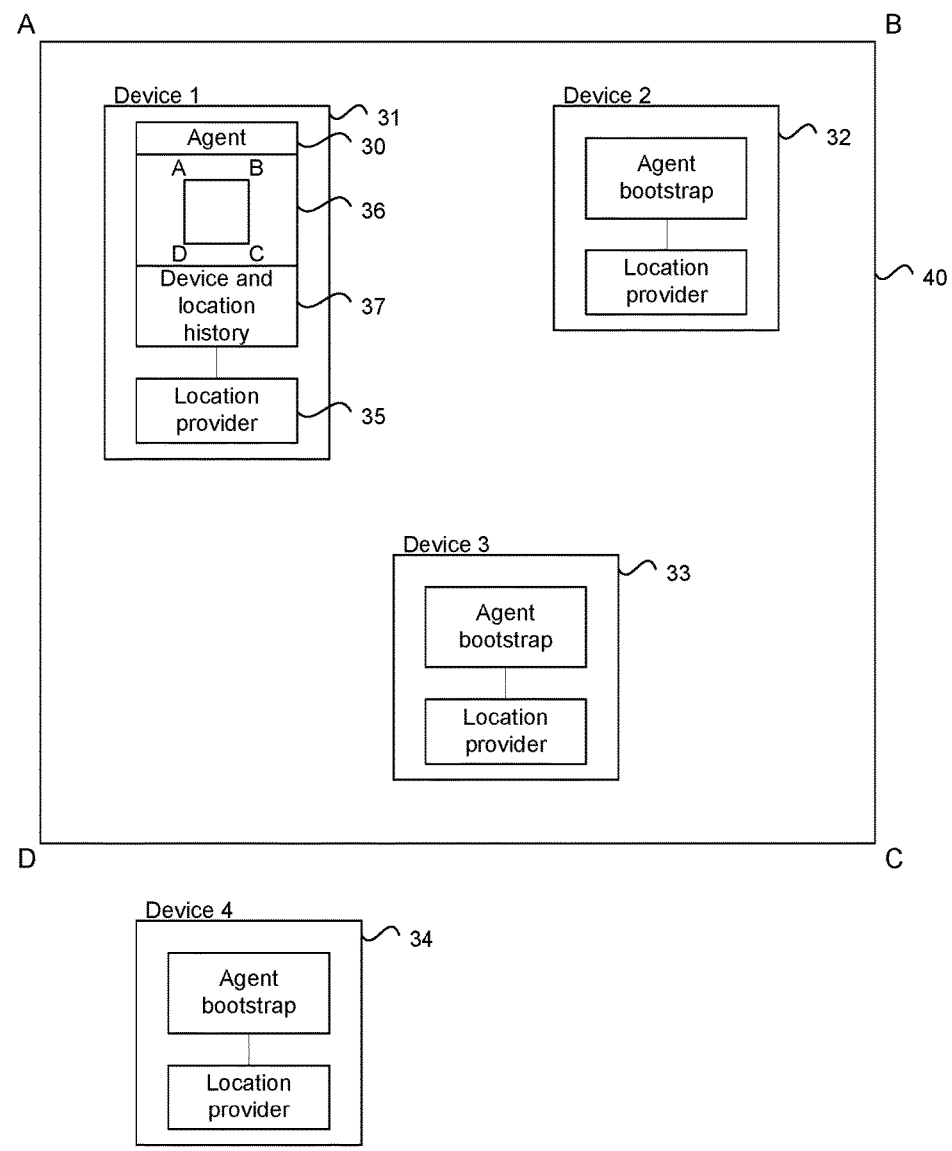
FIG. 3 illustrates a state of the network of FIG. 1 with a device executing an agent application.
Figure 5:
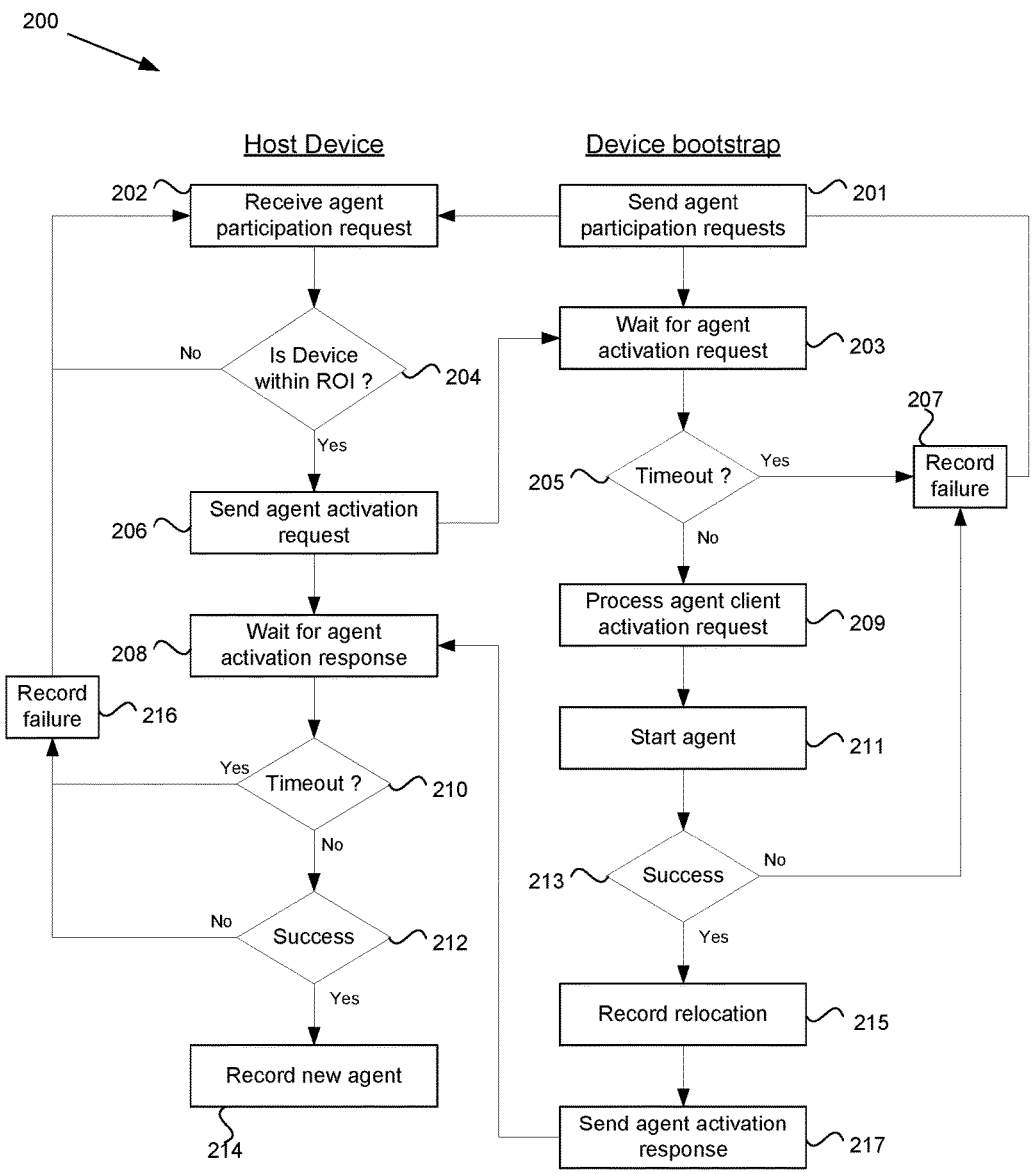
FIG. 5 illustrates a process for copying an agent from a first device to a second device.

Copying of the agent will now be described with reference to FIGS. 3 to 5. FIG. 3 illustrates a state of the network 10, FIG. 4 illustrates communications between two devices during the copying and the process is shown in the flowchart 200 of FIG. 5. In FIG. 3, an ROI 40 is defined with a nominal boundary as depicted. Device_1 31, Device_2 32 and Device_3 33 are operating within the geographic limits of the ROI 40 while Device_4 34 is operating outside of the ROI 40. It is considered that each of the devices 31-34 is capable of supporting agent applications and thus each executes the agent bootstrap code. In addition, each of the devices 31-34 is considered to be location aware by respective location providers of the devices 31-34. The network connectivity may be via Internet Protocols or may be isolated from the Internet with the type and state of the connectivity being largely irrelevant for the purposes of the present disclosure.

At commencement, it is considered that Device_1 has had an agent 30 deployed to it, either from the server 20 (FIG. 1) or from other prior devices within the ROI. The agent 30 includes an ROI definition 36 as well as a device and location history of the agent 37.

Devices 32-34 which are executing the agent bootstrap code send participation requests (step 201), e.g. by broadcast, multicast or by direct communication to receptive devices, and then wait for agent activation requests (step 203). The agent participation request 41 provides the device identity and the current location of the device. At step 202, Device_1 31, which is currently hosting the agent 30, receives agent participation requests 41 from the various other devices 32-34. At step 204, Device_1 31 determines from the agent participation request whether the requesting device is within the ROI 40. For example, the agent on Device_1 would compare the location of Device_4 34 indicated in an agent participation request with the ROI defined within the agent 36 and determine that Device_4 34 is outside of the region of interest 40. In this case, the agent would return to step 202 and await a next agent participation request. Processing of an agent participation request from Device_2 32 however would show that Device_2 is located in the ROI and thus the agent 30 would proceed to step 206 and send an agent activation request 42 to Device_2 32. The agent activation request would return the device ID of Device_2 as well as an agent ID and a serialized version of the agent including both a definition of the ROI and a location of device history of the agent. Device_1 would then proceed to step 208 and await an agent activation response. At Device_2 32, if a timeout occurs (step 205) while awaiting the agent activation request, a failure is recorded (step 207) and Device_2 32 returns to step 201 to send another agent participation request. Otherwise, if no timeout occurs, the agent activation request is processed (step 209). That is, the agent is deserialized and activated and the ROI and agent history is stored prior to starting the agent (step 211). If the agent cannot be successfully started as determined at step 213, then a failure is recorded 207 and Device_2 32 returns to step 201. Otherwise, the copying of the agent is recorded (step 215), e.g. by adding Device_2 32 to the location and device history. Device_2 32 then sends an agent activation response 43 to Device_1 31 which indicates the device ID of Device_2 32, the agent ID and a success or fail indicator.

If Device_1 31 receives the agent activation response 43 before a timeout (step 210) and the agent activation response 43 indicates that the agent has been successfully started on Device_2 (step 212), then agent on Device_1 records the new agent (step 214). Otherwise, the agent on Device_1 records a failure (step 216).

At the conclusion of the process 200, the agent is actively executing on Device_1 31 and on Device_2 32. Either of Device_1 or Device_2 may then continue replicating the agent to other devices within the ROI, such as Device_3 33 following the process as described above.

The agent ID identifies the agent, and may be used by Device_2 to determine if the agent is already available on the device. If Device_2 doesn't have an agent with a matching agent ID, Device_2 must retrieve the correct agent from an external source, e.g., Device_1.

As an alternative to copying the agent, the agent 30 may be configured to move from one device to another. The process for moving may be similar to the process 200 shown in FIG. 5. However, the step of recording the new agent (step 214) may be replaced with the step of terminating the agent on the host device, i.e. Device_1, once indication of a successful activation on Device_2 is received.

Copying or moving of the agent may be triggered by the receipt of an agent activation request from another device within the ROI. Alternatively or in addition, the host device may only become receptive to moving or copying the agent under certain conditions, such as when the device is being shut down, low battery power conditions, exiting the ROI, reduced signal strength, a specific command from the user, and the like.

EXAMPLES

A real-world event could be an unplanned emergency event (such as a fire, flash flood, traffic accident, shooting, etc) or a planned non-emergency event (such as a concert, fair, road repair, sporting event, etc) or a combination (such as traffic congestion, road repair and a traffic accident). The origination of the agent and the ROI is not relevant to this disclosure but can differ based on each scenario. Individual examples are detailed in the following paragraphs.

Disaster search and rescue missions could drop in mobile Base Transceiver Stations (BTS) pre-programmed with a specific ROI and Agents to facilitate propagation to other mobiles that are in or enter the ROI. The agent copies itself to devices as they enter the ROI of the search and rescue effort. The agent might provide response leaders with command and control, enabling the command post to identify each participant, observe the location of each participant, assign search tasks to selected participants, and notify participants of status changes. The agent may change status or cease operating when a participant enters a rest area, departs the ROI, or in some other manner ceases to participate in the search and rescue mission.

A 911 dispatcher could submit an Agent and a ROI to a caller's mobile in response to a traffic accident. The participant can use the camera or various other sensor inputs of the mobile device to indicate the type of injury (or injuries) involved. The police and medical responders can use this information, carried by the agent as it copies itself to additional devices as they enter the region, to quickly facilitate their actions (e.g., will Care-Flight be needed because of traffic congestion?, etc). When the agent determines that the participant has exited the ROI, e.g., by comparing the device's current location with the ROI boundary, the agent moves to another device that is entering the ROI, stops participating in the ROI related to the traffic accident and waits for the next event, or ceases operation. The act of copying or moving to a device that is entering the ROI is an example of the agent achieving the goal of persistence within the ROI.

A mobile user can create an Agent and ROI at a crowded concession stand at a sporting event in order to quickly understand the demands for hot dogs drinks, etc based on the crowd's demands. As customers depart the service counter, the agent detects the movement and either moves to a device approaching the concession stand that isn't already running the agent, or if no such device is available, stops operating.

Other scenarios would be apparent to the skilled addressee from the foregoing embodiments and examples.

In the above examples, the point-to-point communication within a region of interest can help to promote a direct, expedient exchange of information between agents. When an agent detects that its host device has left the ROI, it may terminate the agent. An agent's motivation to stay within a specified ROI, e.g. by moving or copying itself to other agents, allows the device to free up resources acquired by the agent after a power cycle or once the device leaves the ROI boundary.

In one embodiment, there may be defined one or more threshold conditions that enable the agent to provide a graceful termination on a device. In one embodiment, a threshold of the ROI may be defined as a second series of coordinates that define a threshold boundary immediately outside of the ROI boundary. Devices at a location between the threshold boundary and the ROI boundary may be considered to be within the threshold.

In one embodiment, a threshold of the ROI may be defined by signal strength. For example, where a ROI is defined by proximity to base stations a device with a signal strength of less than 20% with a base station within the ROI may be considered to be operating within a threshold region. The signal strength may be used to as a threshold condition irrespective of how the ROI is defined, e.g. by coordinates, base stations or by other means. The choice of threshold signal strength, e.g. 20% is presented herein as an example with any suitable threshold being chosen dependent on the application and implementation.

In a further embodiment, a device may be considered to be operating in a threshold region if the battery life of the device is below a required level, e.g. 20%.

Figure 6:
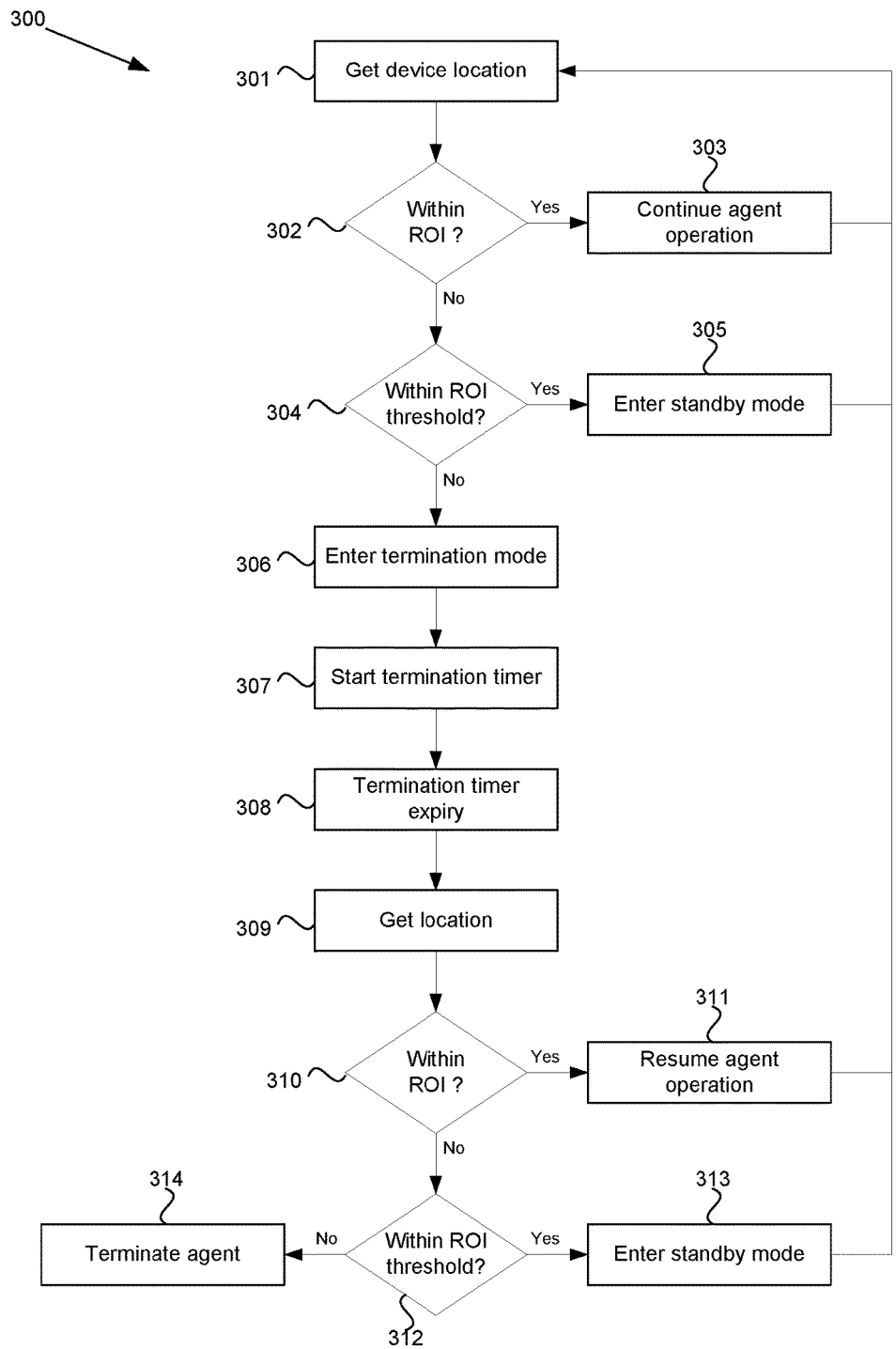
FIG. 6 illustrates a process for terminating an agent on a device.

A process for terminating the agent on a device is shown in the flowchart 300 of FIG. 6. At step 301, the agent is periodically updating the device location. If the agent determines that the device is still comfortably within the ROI (step 302) then normal agent operation continues (step 303). Otherwise the agent may determine if the device is in a geographic threshold region (step 304) and, if so, the agent enters a standby mode (step 305) where the agent actively monitors the device location (step 301) but other agent functions such as data gathering and processing are suspended. In the standby mode, the agent may continue to propagate itself to other devices within the ROI. If step 304 shows the device to be outside of the threshold, then the agent enters a termination mode (step 306) and an optional termination timer is started (step 307). The termination timer provides a final opportunity for the device to re-enter the ROI.

Upon expiry of the termination timer (step 308), or if the termination timer is disabled, a final check of the device location is made (step 309). If the device has re-entered the ROI as determined at step 310, then agent operation is resumed (step 311). If the agent has not re-entered the ROI but is within the ROI threshold, as determined at step 312, then the agent enters the standby mode (step 313). Otherwise, the agent is terminated (step 314), at which time a termination notification message may be broadcast/multicast/unicast to known agents within the ROI.

Where non-geographic threshold conditions are employed, such as based on signal strength and/or device battery power, the agent may enter a standby mode even if the device is within the ROI. Further, more stringent threshold conditions can be applied, such as battery power less than 5%, to cause the agent to enter a termination mode.

Figure 7:
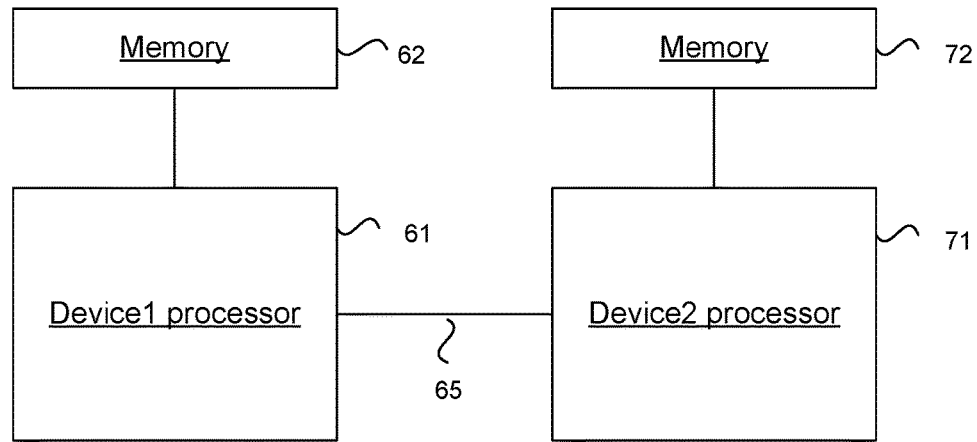
FIG. 7 illustrates a processor and memory of first and second devices.
Figure 8:
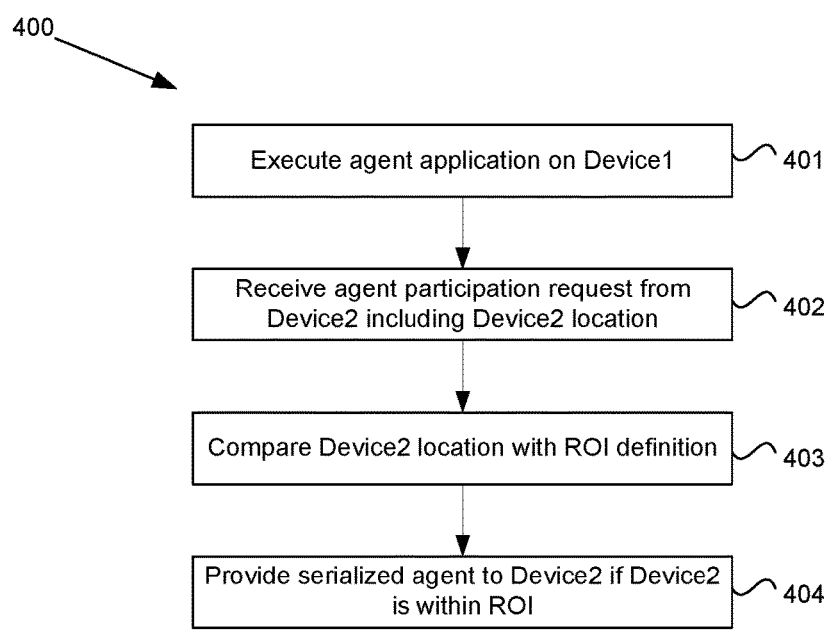
FIG. 8 illustrates an instruction set that can execute on the processor of the first device of FIG. 7.

The components of the system 10 may be embodied in hardware, software, firmware or a combination of hardware, software and/or firmware. In a hardware embodiment, a mobile device such as Device_1 31 may include a processor 61 operatively associated with a memory 62 as shown in FIG. 7. The memory 62 may store an instruction set 400 executable by the processor 61 which may include the bootstrap code described above. The bootstrap code allows the processor 61 to receive an agent application, either from the server 20 or from another mobile device. The instruction set 400, shown in FIG. 8, may include instructions that, when executed, causes the processor 61 to execute the agent application (step 401) which may include storing a definition of the region of interest in the memory 62. When executing, the agent application can receive an agent participation request from a second processor 71 of a second device (step 402), e.g. Device_2 32 (FIG. 3). The agent participation request may be received through a suitable communications link 65, such as a peer-to-peer link or via one or more base stations and/or a server. From the agent participation request, the processor 61 can determine the location of the second device and compare the second device's location with a definition of the region of interest (step 403). If the second device is shown to be within the region of interest, the processor 61 can provide a serialized version of the agent application to the second processor 71 (step 404). The second processor 71, upon receiving the serialized agent application, may deserialize the agent application, store the ROI definition in its respective memory 72 and activate the agent application.

In the embodiments described above, the Region of Interest (ROI) is a static geographic region fixed around a stationary base station e.g., a polygon defined by three or more line segments where each intersection of lines is located at a fixed latitude/longitude. In alternative embodiments to be described below, the ROI may be dynamic and moving. A moving ROI might be defined by the union of radio transceiver coverage of a collection of moving vehicles, e.g., the WiFi signal coverage of two cars equipped with WiFi access points moving in the same direction on a street or highway. An agent executing on a device that is able to communicate with either of the WiFi access points may consider itself to be within the ROI. If the agent requires to replicate or move itself to another device, e.g. due to a deteriorating signal or diminishing battery strength, the agent may replicate or move itself to other devices based on received participation requests from the other devices, as described above.

An agent may copy or replicate itself to other participating devices within the ROI. This serves to flood the ROI with Agents that act independently of or cooperatively with each other and function toward the same goal.

In one embodiment, the ROI may be mobile and may be defined by a mobile population of devices that are able to communicate in a peer-to-peer manner with each other. A mobile ROI may be the volume within which the radio of the mobile device that starts the agent provides a signal strong enough that other devices can detect and connect to the initial device on a peer-to-peer network. Infrared transceivers are a viable alternative to radios for peer-to-peer device communications.

Figure 9:
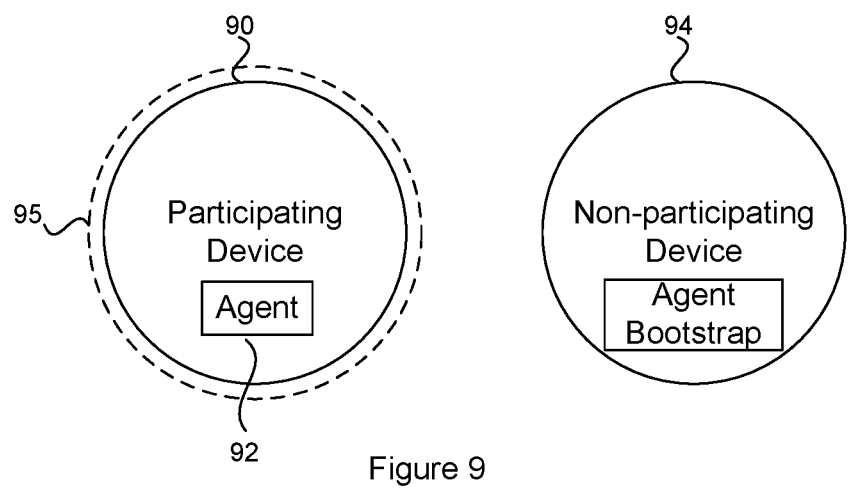
FIGS. 9 and 10 illustrate devices in a mobile region of interest.
Figure 10:
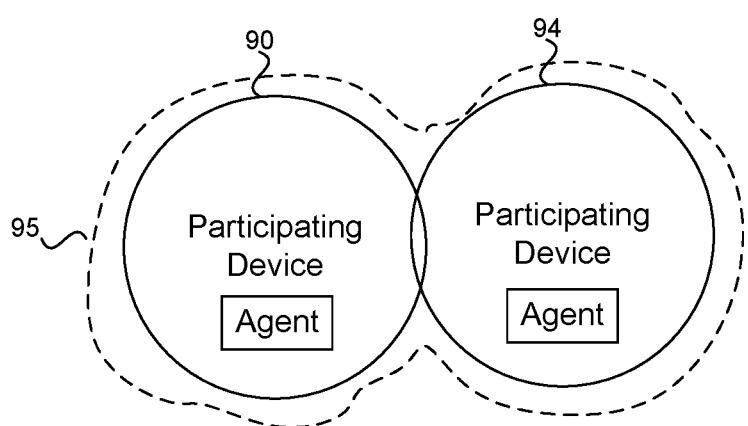
Figure 11:
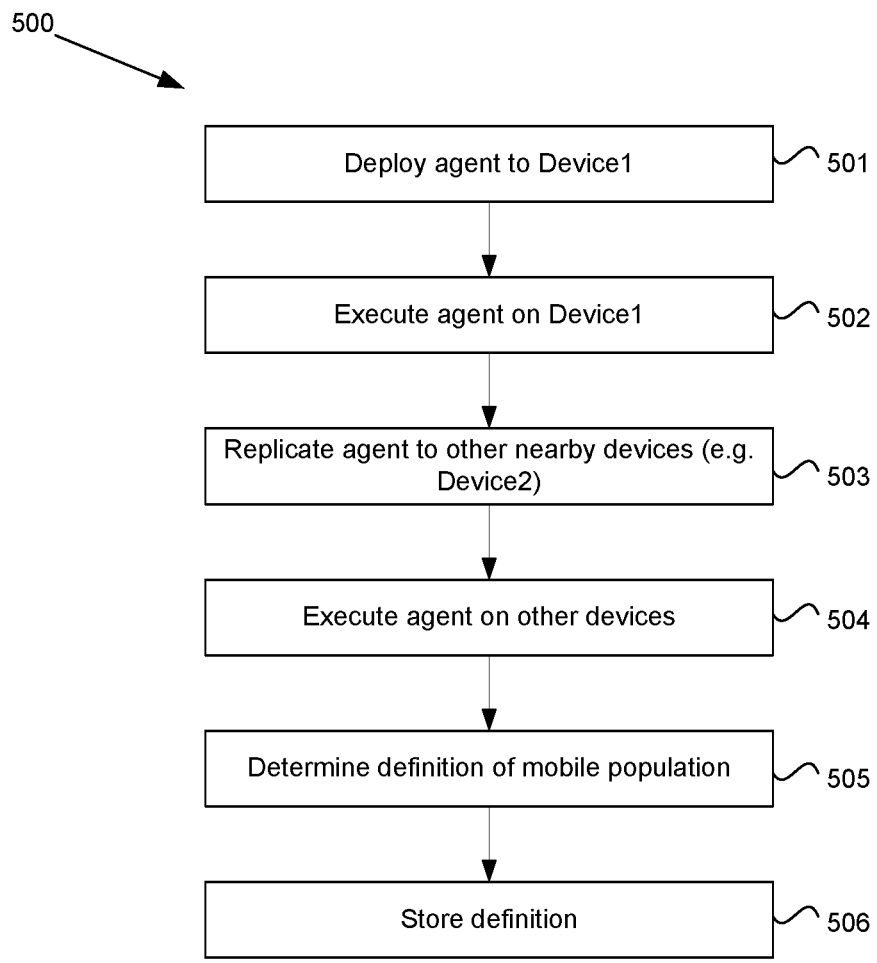
FIG. 11 illustrates a method for persisting an agent in a mobile region of interest.

An embodiment for initializing and evolving a mobile ROI will now be described. With reference to FIGS. 9 and 10 and to the flowchart 500 of FIG. 11. At step 501, an agent application 92 is deployed to a first mobile device 90 and begins executing (step 502). As part of the execution of the agent, the agent looks for other mobile devices 94 within a communication range of device 90 to which the agent can replicate. As shown in FIG. 9, a second, non-participating device 94 is outside the region of radio coverage of the device and so is unable to communicate with the device 90 and thereby is unable to receive the agent from device 90. At some later time, depicted in FIG. 10, the devices 90, 94 have moved so that their radio coverages overlap and they are able to communicate. The agent 92 replicates itself from the original device 90 to the additional device 94, e.g. via an agent bootstrap executing on the device 94 (step 503) and begins executing (step 504). The devices 90 and 94 now define a mobile population of devices or a mobile region of interest. A definition of the mobile population may be defined by a membership list, i.e. device 90, 94 (step 505) and stored in one or more of the agents (step 506). Any device that can execute the agent and can have peer-to-peer communications with either or both of devices 90, 94 can be said to be within the mobile population, indicated in FIG. 10 by the dashed boundary 95.

How the mobile region of interest is defined may be dependent on the particular functions and goals of the agent 92 and many definitions will occur to a person skilled in the art. In one embodiment, it may only be necessary for a device to be in direct communication range of a single other device. In an alternative embodiment, for a device to be considered a member of the mobile population each device may be required to be within a peer-to-peer communication range of all devices of the membership list.

In one embodiment, the ROI may be defined as the collection of devices able to directly or indirectly communicate with each other, e.g., all the devices are in range of a single WiFi access point or the devices are able to dynamically establish mesh network of the sort described by IEEE 802.11s. The moving ROI could be defined as the collection of devices participating in a 802.11s network or similar mesh network. Member devices of such a network might be a group of vehicles moving down a highway, or a squad of soldiers moving across a battlefield. "Defining the ROI" amounts to establishing the 802.11s mesh network. "Joining the ROI" means establishing membership in the 802.11s mesh network.

Some agent-based applications may require every agent to know about and be able to communicate directly with every other agent. Other agent-based applications might use broadcasts (messages addressed to a broadcast address that will be received by zero or more agents listening for broadcasts) to communicate with other ROI members. Using a broadcast or multicast address means the sender doesn't directly address the recipients one by one, and thus needs no membership list.

The definition of the mobile population may be maintained and stored by one or more of the member agents/devices of the mobile population. Changes in membership can be communicated externally of the mobile population, e.g. to management and administration applications. Whether or not such changes in membership will be communicated externally will depend on the functions and goals of the particular executing agent.

Figure 12:
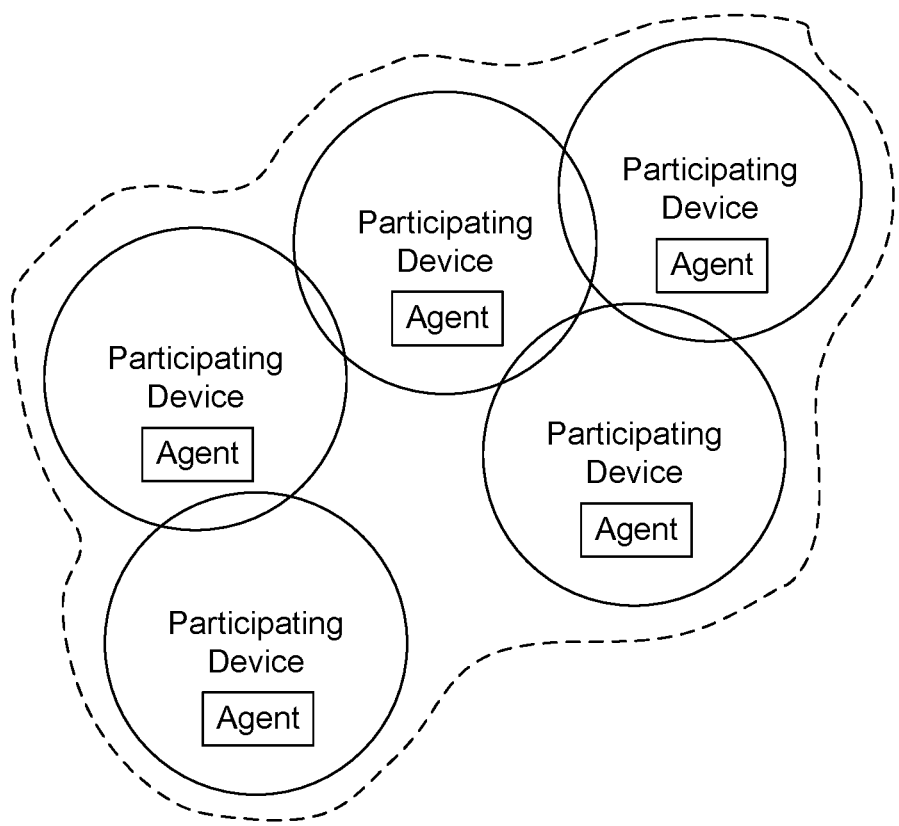
FIG. 12 illustrates several devices in mobile region of interest.

The process of replicating the agent may continue for each suitable mobile device (e.g. one that is executing the agent bootstrap) that comes within communication range of the mobile population so that the mobile population may appear as depicted in FIG. 12. Each agent on a participating device may operate as equal participants to the application or each instance of the agent may have an assigned role, depending on the programmed functions and goals of the agent application. Examples of the mobile agent application are discussed below.

If a device, say Device 1, later moves out of radio coverage of other devices within the mobile population, then device 1 will stop participating in the agent application covered by the mobile population. In some cases, depending on a policy of the agent or a user preference, Device 1 may continue to execute the participating application and thus may define a new mobile population, together with any other devices that it is in communication range with. Alternatively, the agent may shut down on Device1.

A device can figure out which devices it can directly communicate with, and can, if necessary, send a query asking those devices for their lists of ROI members. For example, as part of the procedure for joining an ROI, a device might broadcast a query asking other members to broadcast their identity and ROI status. Similarly, when a device leaves an ROI, it could broadcast a "good bye" message that other members would repeat, resulting notification to all members of the originating device's new membership status. A member device (or the agent participating in the ROI) must be able to answer the "Who do you know are ROI members?" query, and participate in the broadcasts. The agent participating in the ROI may or may not need to know the full membership list; that depends on the agent's purpose and implementation. For example, an agent may need to maintain a list of only the direct neighbor devices hosting an agent that is in the same ROI.

Figure 13:
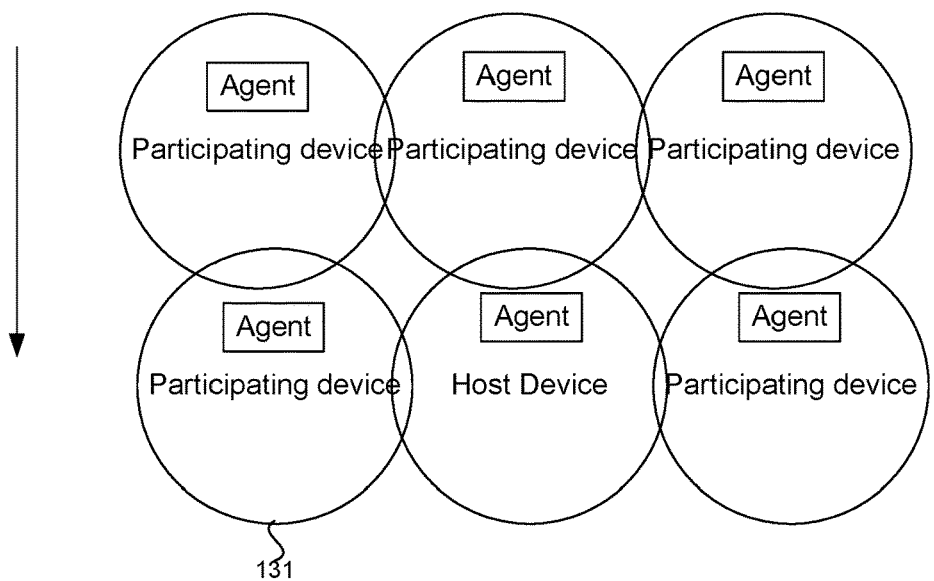
FIGS. 13 and 14 illustrate evolution of a mobile region of interest.
Figure 14:
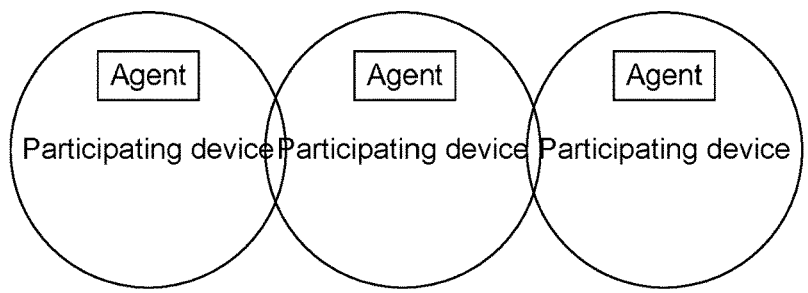
Figure 14:
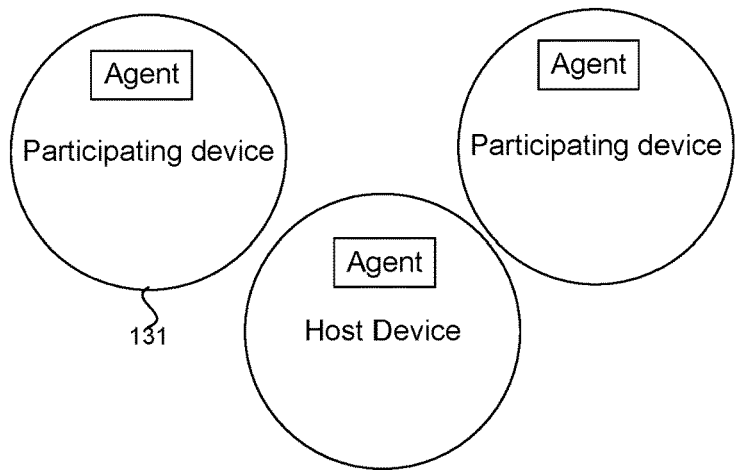

Scenario 1: An Army squad leader operating in the field defines and establishes a mobile Region of Interest as the collection of mobile devices used by members of the squad able to directly or indirectly communicate with the squad leader's device. For example, the squad members might establish an ad-hoc wireless network, e.g., based on 802.11s, and define the ROI as the area covered by the wireless network. Squad members join the ROI. As the squad moves the ROI moves with them. When the squad gets near another friendly squad, the agents in the ROIs authenticate each other and merge the ROIs. As squad members leave, perhaps because they get out of radio range, the ROI and other personnel join or rejoin, the agents transparently adjust themselves to maintain the ROI. Consider that the ROI of the squad (either the original or the merger of the two) is shown in FIG. 13 and that the Agent is operating on all devices in the ROI. As Device 131 moves away from the other Devices it loses the ability to communicate with the other Agents, and as a result, loses membership in the ROI (FIG. 14). When Device 131 crosses into the threshold area, defined in this scenario in terms of signal strength, it notifies the other Agents it is probably ceasing to participate in the ROI. This happens in a manner similar to, or as an alternate and optional step in, the process shown in FIG. 6. The other Agents note the departure message and take actions appropriate, e.g., the Agent on the squad commander's Device might notify the commander of the departure.

Scenario 2: Consider a cycling team composed of cyclists, a coach, a manager, and support staff. The coach or manager starts an agent that assists while the team is moving. The boundary of the moving ROI is defined by the union of the radio coverage of each team member that is in range of other team members. The agent monitors the location of the team, the status of individual team members, etc., moving from member to member as necessary. When a member leaves the ROI, e.g., by moving out of radio range of all the other team members, the agent ensures that it can continue operating by moving to a team member who is remaining in the ROI. How the agent reacts to membership changes of the ROI will depend on the programming of the agent. For example, the coach or manager may define the actions the Agent should take for a given event. Options would include replicating itself to create a second ROI, notifying the coach of the change in membership, etc. Policies or rules may be defined to ensure that the agent replicates as necessary to maintain an ROI for every team member, with a mirror rule governing when to merge two ROIs.

Scenario 3: A team of first responders arrives on scene. Each responder carries a mobile device able to participate in a peer-to-peer network, and each mobile asset (ambulance, fire truck, police car, etc.) is also able to participate in the same peer-to-peer network. A geographic, immobile ROI is established, defined as a polygon whose vertices are specified as a GPS coordinate. As participants in the immobile ROI leave, e.g., medics leaving in an ambulance with a patient, a mobile ROI is created among the moving devices. An agent operating on medic's mobile device containing medical information about the patient moves from the medic's device to the ambulance, e.g., to display patient information on large display installed in the ambulance rather than on the mobile device's small display. The agent might also choose or be told the ambulance's destination, establish a connection to the destination facility, and provide the destination facility staff information about the patient, the ambulance, etc.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
   executing an agent in a first mobile region of interest on a first mobile device;
   replicating the agent on at least one second mobile device;
   executing the agent in a second mobile region of interest on the at least one second mobile device;
   merging a definition of the first mobile region of interest with a definition of the second mobile region of interest when a mobile device of the first mobile region of interest comes within a communication range of a mobile device of the second mobile region of interest, wherein the first mobile device and the second mobile device are able to dynamically establish a mesh network; and removing any mobile device from the mobile region of interest that are unable to communicate within the mobile region of interest, wherein such removal of the mobile device may be further determined by meeting threshold conditions of the mobile region of interest.

2. The method of claim 1 wherein replicating the agent comprises copying the agent from the first mobile device to the at least one second mobile device.

3. The method of claim 1 wherein replicating the agent comprises deploying the agent from a deployment point to the at least one second mobile device.

4. The method of claim 1 comprising joining one or more further mobile devices to a mobile population of devices when the one or more further mobile devices come within a communication range of at least one mobile device within the mobile region of interest.

5. The method of claim 1 wherein the agent is configured to engage in peer-to-peer communication with the second mobile device.

6. The method of claim 1 comprising defining a second mobile region of interest comprising the removed mobile device.

7. The method of claim 1 wherein the definition of the mobile region of interest comprises a membership list of mobile devices.

8. The method of claim 1 comprising deploying an agent to a first mobile device.

9. The method of claim 1 comprising updating the definition of the mobile region of interest.

10. The method of claim 9 wherein updating the definition of the mobile region of interest comprises determining which mobile devices are in a communication range of each other.

11. The method of claim 9 wherein updating the definition of the mobile region of interest comprises removing from the definition of the mobile region of interest any mobile devices that are not in communication range.

12. A mobile device, comprising:
a processor configured to:
replicate an agent application to a second mobile device if the second mobile device is within a mobile region of interest;
merge a definition of the mobile region of interest associated with the mobile device and with the second mobile device;
determine which mobile devices from the merged definition of the mobile region of interest are in communication range of each other, wherein the mobile device and the second mobile device are able to dynamically establish a mesh network; and
remove from the merged definition of the mobile region of interest any mobile devices of the definition that are not in communication range, wherein such removal of the mobile device may be further determined by meeting threshold conditions of the mobile region of interest.

13. The mobile device of claim 12 wherein the agent application is configured to determine whether the mobile device and the second mobile device are members of a same mesh network.

14. The mobile device of claim 12 wherein the agent application is configured to engage in peer-to-peer communication with a second mobile device.

15. The mobile device of claim 12 wherein the agent application is configured to determine whether a second mobile device is within a mobile region of interest.

16. The mobile device of claim 12 wherein the agent application is configured to remove the mobile device from a definition of the mobile region of interest when the mobile device moves out of the mobile region of interest.

17. The mobile device of claim 12 wherein the agent application is configured to initiate a second mobile region of interest incorporating the mobile device.

18. A non-transitory computer-readable medium comprising computer-executable instructions that, when executed, cause at least one processor to:
define a mobile region of interest incorporating a communication range of a first mobile device;
replicate an agent application to a second mobile device comprising a second mobile region of interest;
merge a definition of the second mobile region of interest with the definition of the first mobile region of interest, wherein the first mobile device and the second mobile device are able to dynamically establish a mesh network; and
update the definition of the mobile region of interest to remove any mobile devices that are not within a communication range of at least one mobile device within the mobile region of interest, wherein such removal of the mobile device may be further determined by meeting threshold conditions of the mobile region of interest.

19. The non-transitory computer-readable medium of claim 18 comprising computer-executable instructions that, when executed, cause the at least one processor to engage in peer-to-peer communication with a second mobile device.

20. The non-transitory computer-readable medium of claim 18 comprising computer-executable instructions that, when executed, cause the at least one processor to execute an agent application.

* * * * *